(12) United States Patent
Sofie et al.

(10) Patent No.: US 6,484,739 B1
(45) Date of Patent: Nov. 26, 2002

(54) SLIDABLE DOOR AND SIDEWALL ASSOCIATED WITH TENTS, AWNINGS, AND OTHER PROTECTIVE ENCLOSURES

(75) Inventors: Michael P. Sofie, Lake Forest Park; John A. Barrett, Seattle, both of WA (US)

(73) Assignee: Barrett Enclosures, Inc., Seattle, WA (US)

(*) Notice: Subject to any disclaimer, the term of this patent is extended or adjusted under 35 U.S.C. 154(b) by 0 days.

(21) Appl. No.: 09/387,308

(22) Filed: Aug. 31, 1999

(51) Int. Cl.⁷ .............................................. E04H 15/58
(52) U.S. Cl. ..................... 135/117; 135/120.3; 114/361
(58) Field of Search ................................ 160/123, 124, 160/126, 330, 345; 135/117, 119, 120.2, 120.3, 129; 114/201 R, 203, 361; 428/52, 192

(56) References Cited

U.S. PATENT DOCUMENTS

| | | | |
|---|---|---|---|
| 3,241,877 A | 3/1966 | Tate | 296/136 |
| 3,604,440 A | 9/1971 | Wilson | 135/6 |
| 3,663,333 A | 5/1972 | Palfreyman | 156/256 |
| 4,466,374 A | 8/1984 | Katz | 114/71 |
| 4,668,324 A | 5/1987 | Burns | 156/247 |
| 5,027,739 A | 7/1991 | Lackovic | 114/361 |
| 5,061,332 A | 10/1991 | Stolz et al. | 156/94 |
| 5,121,703 A | 6/1992 | Smith | 114/361 |
| 5,472,771 A | 12/1995 | Sofie et al. | 428/192 |
| 5,660,916 A | 8/1997 | Sofie et al. | 428/192 |
| 5,851,637 A | 12/1998 | Sofie et al. | 428/192 |
| 6,003,583 A | * 12/1999 | Lacoste et al. | 160/DIG. 16 |

* cited by examiner

*Primary Examiner*—Peter M. Cuomo
*Assistant Examiner*—Jerry A. Anderson
(74) *Attorney, Agent, or Firm*—Seed Intellectual Property Law Group PLLC

(57) ABSTRACT

The invention is generally directed to a foldable door and sidewall, and more particularly, to a foldable door and sidewall suitable for use with tents, awnings, restaurant patio shielding, and other protective enclosures. The invention is also directed to methods for retrofitting a protective enclosure (e.g., frame structure associated with a collapsible tent) with a foldable door or sidewall, as well as to kits for accomplishing the same. In one embodiment, a foldable door or sidewall is disclosed that is adapted for detachable attachment with a protective enclosure, wherein the foldable door or sidewall comprises a flexible sheet having a continuous perimeter that defines a plurality of discrete door or sidewall edges, wherein at least one of the door or sidewall edges is adapted to slidably engage a slide track, and at least one magnet integrally associated with at least one of the door or sidewall edges of the flexible sheet, wherein the door or sidewall edge having the at least one magnet integrally associated therewith is not the same as the door or sidewall edge adapted to slidably engage the slide track.

25 Claims, 11 Drawing Sheets

SLIDABLE DOOR AND SIDEWALL ASSOCIATED WITH TENTS, AWNINGS, AND OTHER PROTECTIVE ENCLOSURES

TECHNICAL FIELD

The present invention is generally directed to a slidable door and sidewall, and more particularly, to a slidable door and sidewall suitable for use with tents, awnings, restaurant patio shielding and other protective enclosures, as well as methods related thereto.

BACKGROUND OF THE INVENTION

There are numerous types of protective enclosures available for protecting an interior space from the elements. For example, tents, awnings, canopies, and other protective structures are readily available from a number of different manufacturers for those interested in shielding an interior space from one or more natural elements such as sun, wind, rain and snow. Such protective enclosures are available in all kinds of shapes and sizes, and are known to be made from both natural and synthetic materials, including blends thereof.

Historically, canvas and other natural fabrics have been used in the manufacture of protective enclosures. Tents and awnings, for example, have historically been made from canvas because canvas provides for a high-level of protection from the elements, and because canvas is generally readily foldable into a more compact structure, which is highly desirable for purposes of storage and transport. More recently, however, protective enclosures have also been made from a variety of synthetic fabrics which are also readily foldable, synthetic fabrics such as those made with polyamide (e.g., nylon), polyester, polytetrafluoroethylene (e.g., GORE-TEX), and polyvinylchloride, as well as various blends thereof. In either case, the natural and synthetic fabrics used in the manufacture of protective enclosures are generally considered to be either fibrous, like canvas, or non-fibrous (i.e., nonwoven), like many synthetic fabrics such as vinyl sheets.

A significant improvement associated with protective enclosures, made from either a natural and/or synthetic fabric, has been the development of transparent windows and doors. More specifically, protective enclosures for boats and automobiles have been developed that include one or more transparent windows that allow for unobstructed viewing for the occupant(s) within the interior space associated therewith. For example, transparent windows have been incorporated into automobile convertible tops (e.g., rear windows), as well as boat enclosures (e.g., sailboat storm dodger). These windows have traditionally been made from either glass or clear vinyl. Similarly, tents and awnings have likewise incorporated transparent windows into their respective doorways and sidewalls; however, these windows have usually been made from only clear vinyl, and not glass, for obvious safety reasons.

There are, however, several drawbacks associated with protective enclosures having glass and clear vinyl windows. For example, because glass is generally inflexible and a relatively poor shock absorber, it may readily break and thus has only limited utility in an otherwise flexible and foldable protective enclosure. As a substitute for glass, clear vinyl sheets have been utilized for windows; however, such clear vinyl has a tendency to form wrinkles and creases with use, it scratches relatively easily, and it may lose its transparency (e.g., yellow) over time. Furthermore, clear vinyl is somewhat susceptible to changes in size and shape as a result of temperature fluctuations.

An alternative to both glass and clear vinyl windows has been the use of semi-rigid clear plastic materials, such as polycarbonate and acrylic-based thermoplastic sheets. These materials are characterized by high transparency, ease of cleaning, and high shock resistance. Moreover, these materials are generally not susceptible to changes in size and shape as a result of temperature fluctuations. As such, the use of semi-rigid clear plastic materials as windows in protective enclosures has been seen as a significant improvement over glass and clear vinyl, especially in the context of high-end boat enclosures and party/exhibition tents. Exemplary in this regard is U.S. Pat. No. 5,121,703 to Smith and U.S. Pat. No. 5,472,771 to Sofie et al.

Although protective enclosures having semi-rigid clear plastic windows are now available, there are still several shortcomings associated with existing protective enclosures that need to be overcome. For example, and in the context of high-end boat enclosures and party/exhibition tents, existing protective enclosures generally include one or more doors, several sidewalls, as well as a plurality of windows. The doors and windows are typically opened and closed by means of a zipper; however, other means such as snaps, buttons, tie-downs, and VELCRO are also known. Similarly, the sidewalls of such protective enclosures are typically attached to one another (as well as to (1) flexible ropes and/or awning cords generally associated with the underlying rigid/flexible framing structure of pole tents, and (2) rigid cross-members generally associated with the underlying rigid framing structure of span tents) by means of a zipper, snaps, buttons, tie-downs or VELCRO. The use of such attachment means poses several disadvantages.

For example, zippers, snaps, buttons, tie-downs and VELCRO are all somewhat cumbersome to use in the sense that they require a relatively high level of physical and cognitive effort to successfully operate. As such, zippers, snaps, buttons, tie-downs, VELCRO, and the like may pose a significant safety concern in an emergency situation. Indeed, large party/exhibition tents are generally occupied with their doors open, or at least unsecured, to facilitate evacuation in the event of a fire or other emergency. In addition, the assembly and disassembly of protective enclosures such as party/exhibition tents (and storage of the same) is often an arduous task because of the multiple and non-modular components involved.

Accordingly, and although significant advances have been made in the field of protective enclosures, there is still a need in the art for improved protective enclosures and methods related thereto. In particular, there is a need for foldable doors and sidewalls associated with such protective enclosures. The present invention fulfills these needs, and provides for further related advantages.

SUMMARY OF THE INVENTION

In brief, the present invention is generally directed to a slidable door and sidewall, and more particularly, to a slidable door and sidewall suitable for use with tents, awnings, restaurant patio shielding, and other protective enclosures. The present invention is also directed to methods for retrofitting a protective enclosure (e.g., frame structure associated with a collapsible tent) with a slidable door or sidewall, as well as to kits for accomplishing the same.

In one embodiment, the present invention is directed to a foldable door or sidewall adapted for detachable attachment with a protective enclosure, wherein the foldable door or sidewall comprises a flexible sheet having a continuous perimeter that defines a plurality of discrete door or sidewall edges, wherein at least one of the door or sidewall edges is adapted to slidably engage a slide track, and further comprises at least one magnet integrally associated with at least one of the door or sidewall edges of the flexible sheet, wherein the door or sidewall edge having the at least one magnet integrally associated therewith is not the same as the door or sidewall edge adapted to slidably engage the slide track. The foldable door or sidewall may further comprise a semi-rigid thermoplastic resinous sheet in an integral and coplanar relationship with the flexible sheet, wherein the semi-rigid thermoplastic resinous sheet defines a window. In addition, the flexible sheet may be either a fibrous material, a non-fibrous material, as well as various blends thereof. The semi-rigid thermoplastic resinous sheet may be transparent, and may have a decorative decal or strip affixed thereto so as to alter the transparency of the otherwise transparent thermoplastic resinous sheet.

In another embodiment, the present invention is directed to a collapsible protective enclosure suitable for protecting an interior space from one or more natural elements, wherein the collapsible protective enclosure includes a frame structure that defines the interior space, wherein the interior space further defines a floor, a plurality of walls, and a roof, wherein the roof and plurality of walls intersect at a plurality of edges, and wherein the frame structure includes a cross-member spanning across at least one of the walls and adjacent to at least one of the plurality of edges, comprising: a slide track having at least one groove adapted to slidable engage a rod, wherein the slide track is detachably attached to the cross-member; and a door or sidewall that includes a flexible sheet having a continuous perimeter that defines a plurality of discrete door or sidewall edges, the flexible sheet being in a coplanar relationship with at least one of the walls, wherein at least one of the door or sidewall edges has a welt that is slidably engaged to the at least one groove of the slide track, and wherein another of the plurality of door or sidewall edges has at least one magnet integrally associated therewith.

In still another embodiment, the present invention is directed to an architectural window adapted for integral association with a foldable door or sidewall of a collapsible protective enclosure. The architectural window comprises a flexible sheet having a continuous perimeter that defines a plurality of discrete edges; a semi-rigid thermoplastic resinous sheet in an integral and coplanar relationship with the flexible sheet; and at least one magnet integrally associated with the flexible sheet or the semi-rigid sheet, wherein the at least one magnet is adapted to maintain the architectural window in a closed position.

The present invention is also directed to a method for retrofitting a protective enclosure with a foldable door or sidewall. The method comprises the discrete steps of: providing a protective enclosure, wherein the protective enclosure includes a cross-member, and wherein the cross-member spans across a portion of the protective enclosure; attaching one or more slide track supporting devices to the cross-member; attaching a slide track to the one or more slide track supporting devices, wherein the slide track has at least one groove adapted to engage a welt associated with an edge of the foldable door or sidewall; and engaging the welt with the at least one groove of the slide track such that the foldable door or sidewall is in slidable engagement with the slide track.

In yet another embodiment, the present invention is directed to a kit adapted to retrofit a protective enclosure with a foldable door or sidewall. The kit includes at least the following components: a foldable door or sidewall, wherein the foldable door or sidewall comprises a flexible sheet, the flexible sheet having a continuous perimeter that defines a plurality of discrete door or sidewall edges, wherein at least one of the door or sidewall edges has a welt; a slide track having at least first and second grooves, wherein the first groove is adapted to slidably engage the welt of the foldable door or sidewall and the second groove is adapted to engage a rod; and one or more hooks having adjustable straps, wherein each of the one or more hooks has a hooked end adapted to detachably attach to a cross-member associated with the protective enclosure and a flat end having at least two slits adapted to adjustably engage a strap, and wherein each of the one or more straps is connected to the rod.

These and other aspects of the present invention will be evident upon reference to the following detailed description and related Figures.

DETAILED DESCRIPTION OF THE INVENTION

As noted above, the present invention is generally directed to a slidable door and sidewall, and more particularly, to a slidable door and sidewall suitable for use with tents, awnings, restaurant patio shielding, and other protective enclosures. The present invention is also directed to methods for retrofitting a protective enclosure (e.g., frame structure associated with a collapsible tent) with a slidable door or sidewall, as well as to kits for accomplishing the same. Although many specific details of certain embodiments of the present invention are set forth in the following detailed description and accompanying Figures, those skilled in the art will recognize that the present invention may have additional embodiments, or that the invention may be practiced without several of the details disclosed herein.

In one embodiment, the present invention is directed to a collapsible protective enclosure suitable for protecting an interior space from one or more natural elements such as, for example, sun, wind, rain, and snow. As such, the term "protective enclosure" (as used within the context of the present invention) is to be construed broadly so as to encompass all types of tents, awnings, cabanas, canopies, gazebos, sunshades/wind blocks (for use with, for example, restaurant patios), tops/shielding (suitable for use with, for example, boats/motor vehicles), as well as like protective systems. In this context, and for purposes of illustrating the present invention, the underlying frame structure and protective covering associated with two exemplary prior art collapsible protective enclosures (namely, a span tent and a pole tent) are shown in FIGS. 1A–B and FIGS. 2A–B, respectively.

Figure 1A:
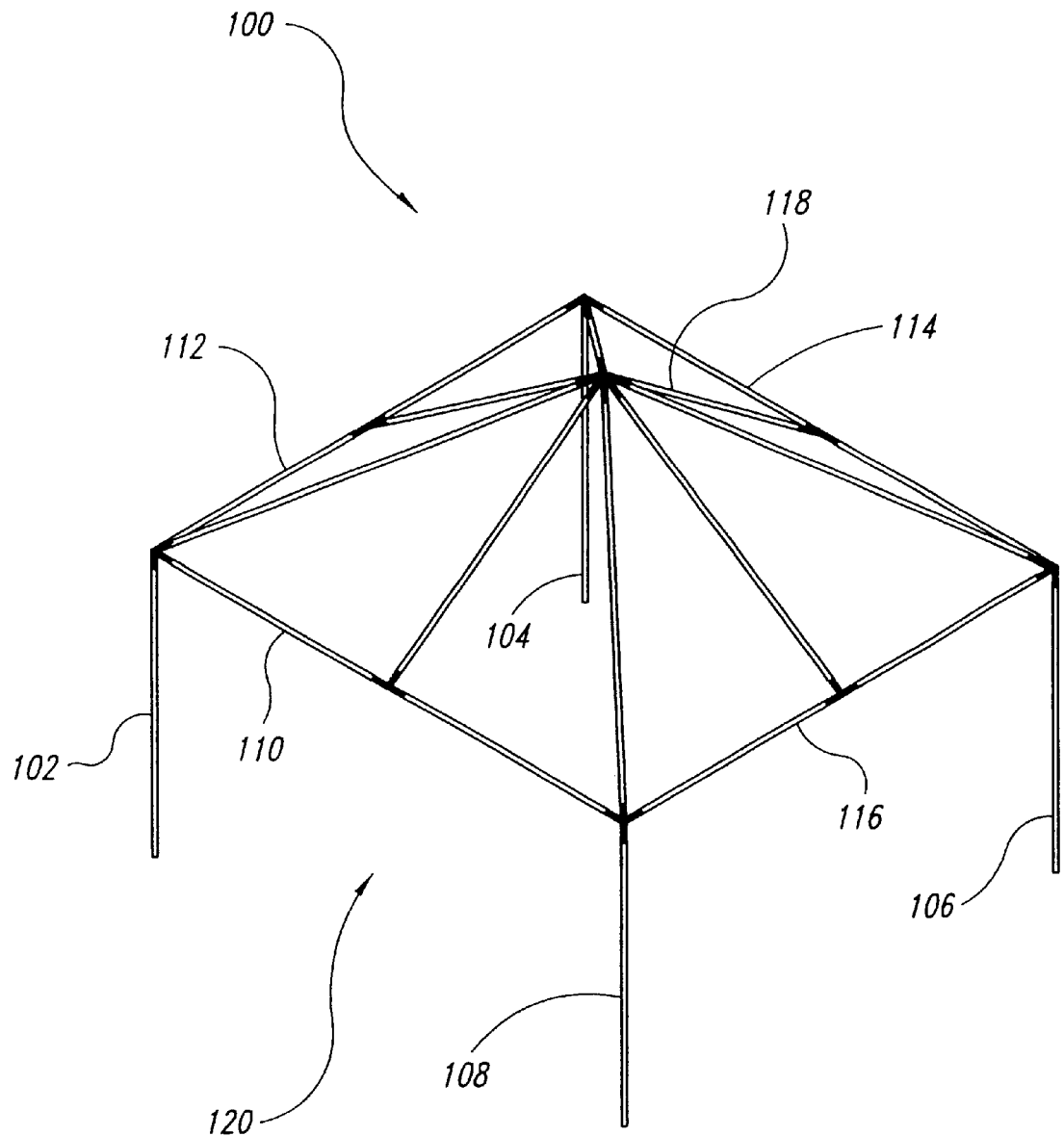
FIG. 1A is a top perspective view of a representative prior art frame structure associated with a span tent.
Figure 1B:
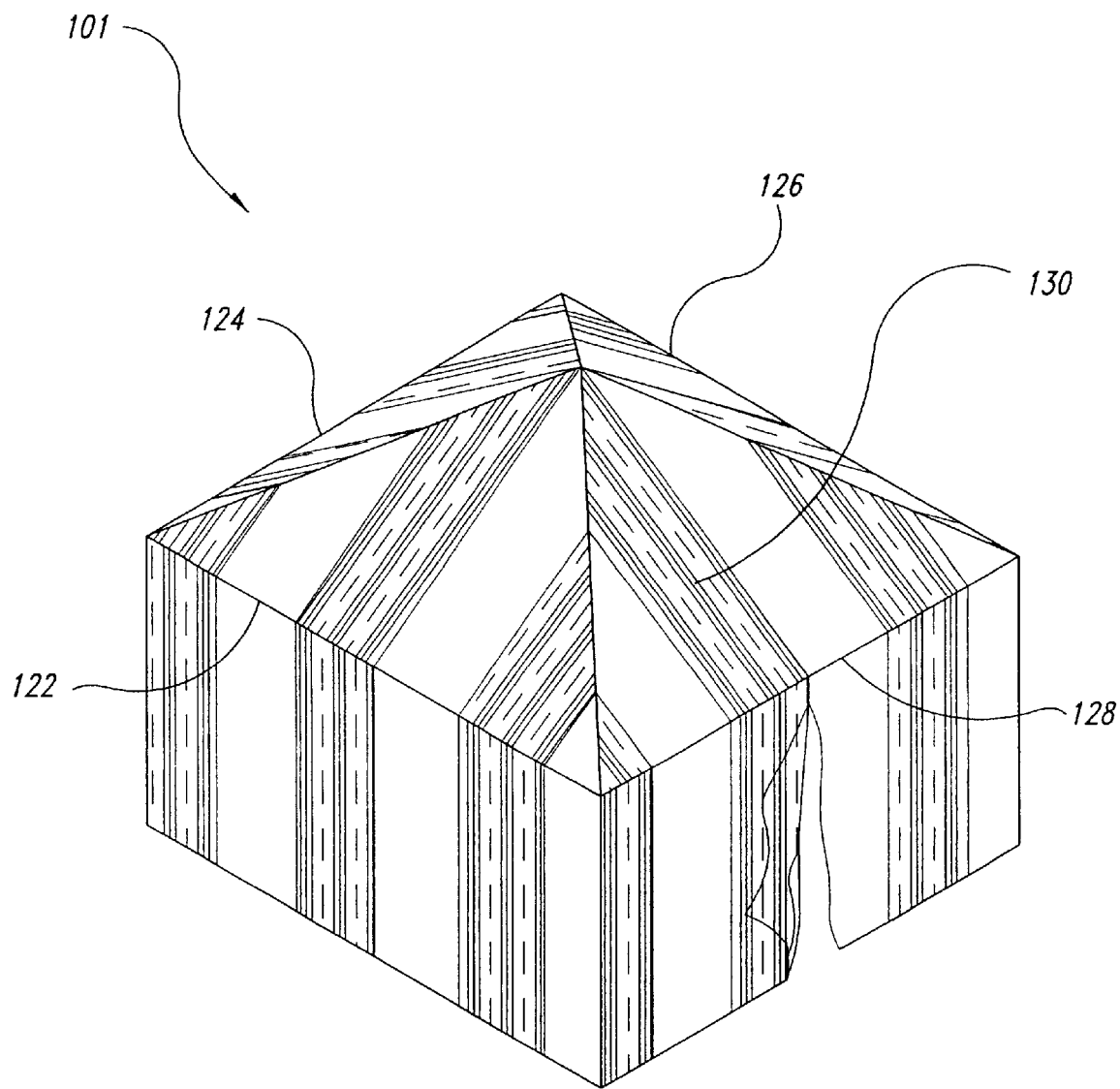
FIG. 1B is a top perspective view of a representative prior art span tent.

More specifically, and as shown in FIG. 1A, a frame structure 100 of an exemplary prior art span tent (covering not shown) consists of four legs 102, 104, 106, 108, four cross-members 110, 112, 114, 116, and a roof support structure 118 that, in combination, defines an interior space 120. The interior space 120 defined by frame structure 100 further defines a floor, four walls, and a roof (none shown), wherein the four walls and roof intersect at four corresponding edges (which edges 122, 124, 126, 128 are shown in corresponding FIG. 1B). Thus, the four edges associated with the intersection of the roof and four walls are adjacent and parallel to respective cross-members 110, 112, 114, 116. FIG. 1B shows the exemplary span tent 101 having a protective covering 130 draped over and fastened to the frame structure 100 of FIG. 1A.

Figure 2A:
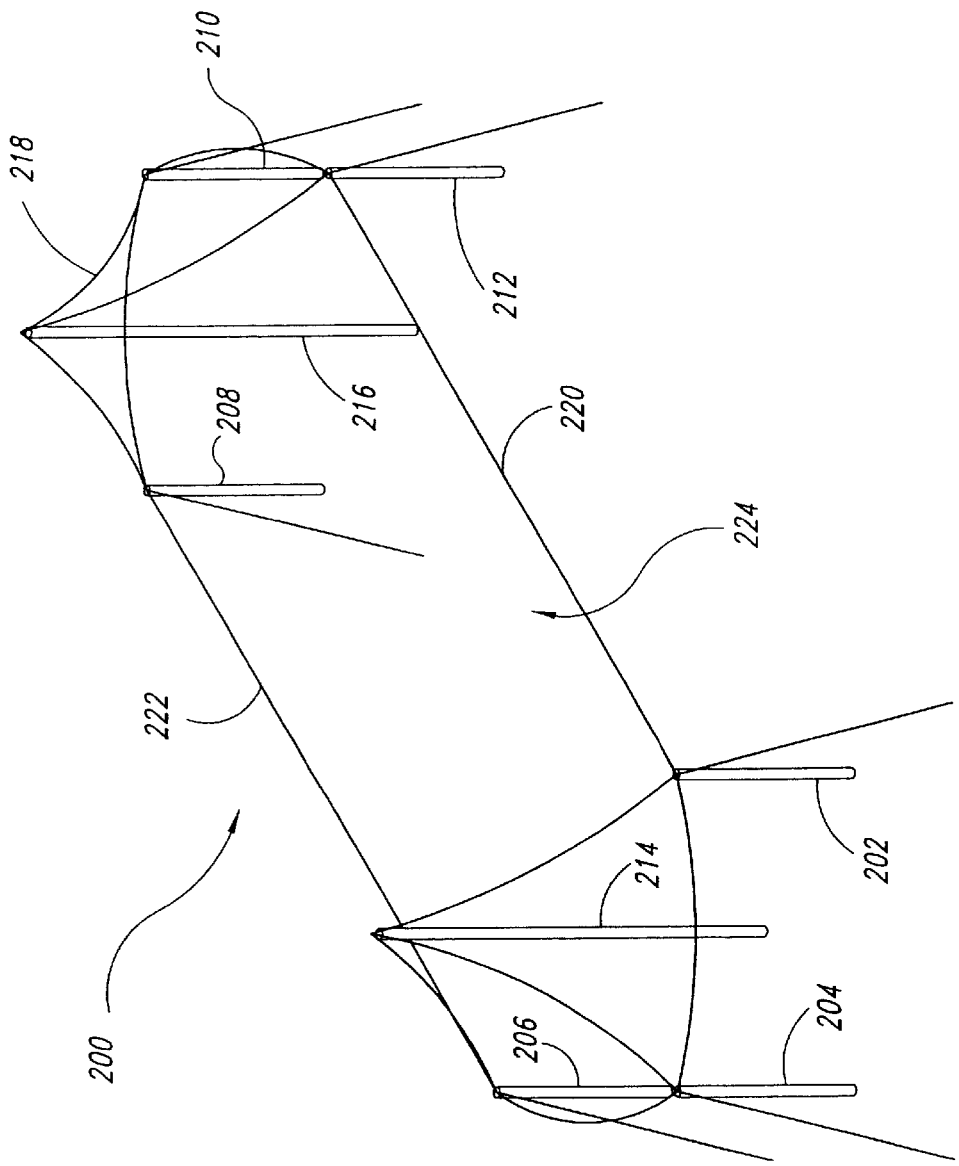
FIG. 2A is a top perspective view of a representative prior art frame structure associated a pole tent.
Figure 2B:
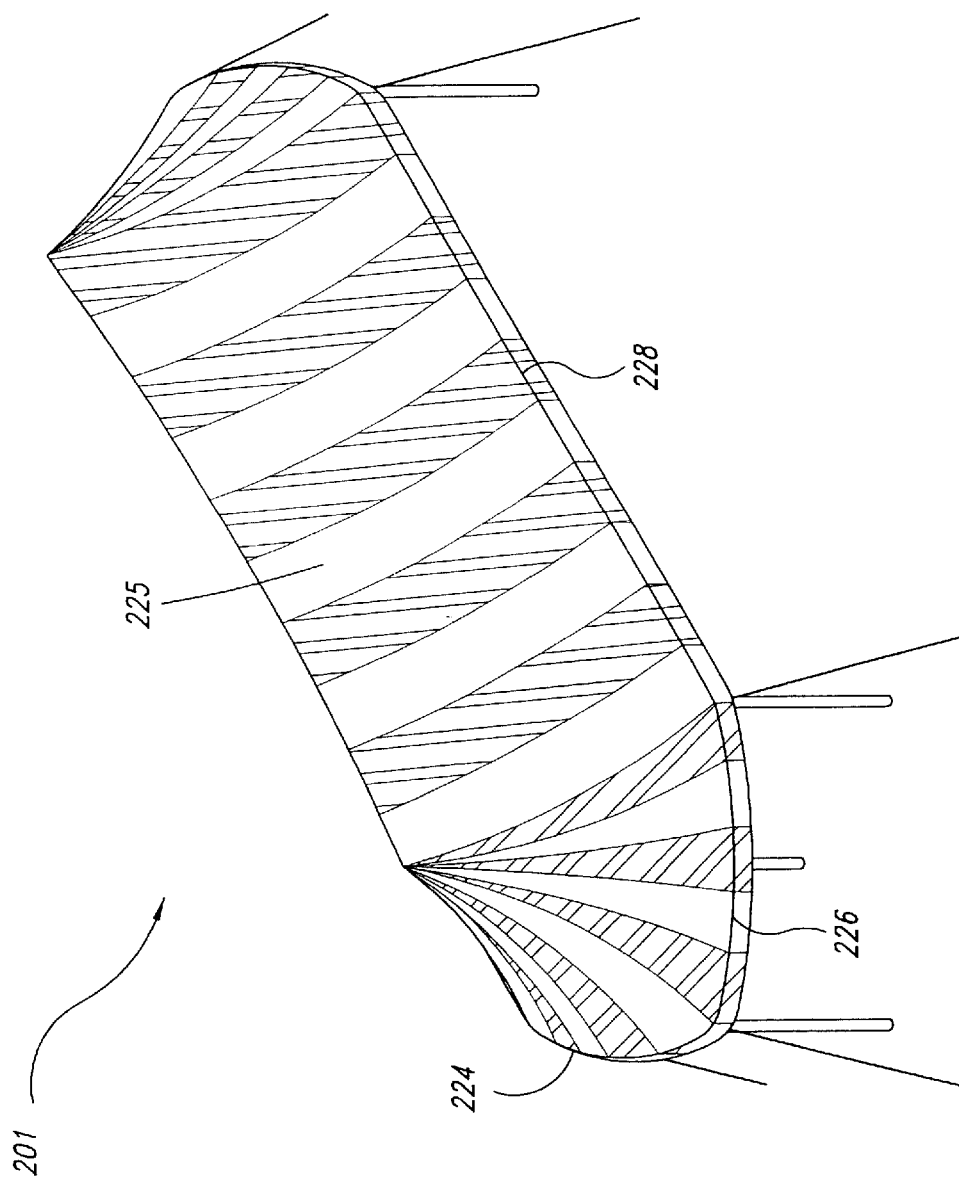
FIG. 2B is a top perspective view of a representative prior art pole tent.

Similarly, and as shown in FIG. 2A, a frame structure 200 of an exemplary prior art pole tent (covering not shown) consists of six exterior legs 202, 204, 206, 208, 210, 212 and two interior poles 214, 216. The frame structure 200 also consists of a securing rope network 218, which, in turn, consists of two cross-members 220, 222. In addition, the frame structure 200 also defines an interior space 224 bounded by a defined floor, six walls and a roof (none shown). FIG. 2B shows the exemplary pole tent 201 having a protective covering 225 partially draped over and fastened to the frame structure 200 of FIG. 2A, thereby defining six edges (of which only three edges 224, 226, 228 are shown). Thus, six edges are defined by the intersection of the roof and six walls, wherein two of the edges are adjacent and parallel to the two cross-members 220, 222 (i.e., edge 228 of FIG. 2B is adjacent and parallel to cross-member 220 of FIG. 1A).

Figure 3B:
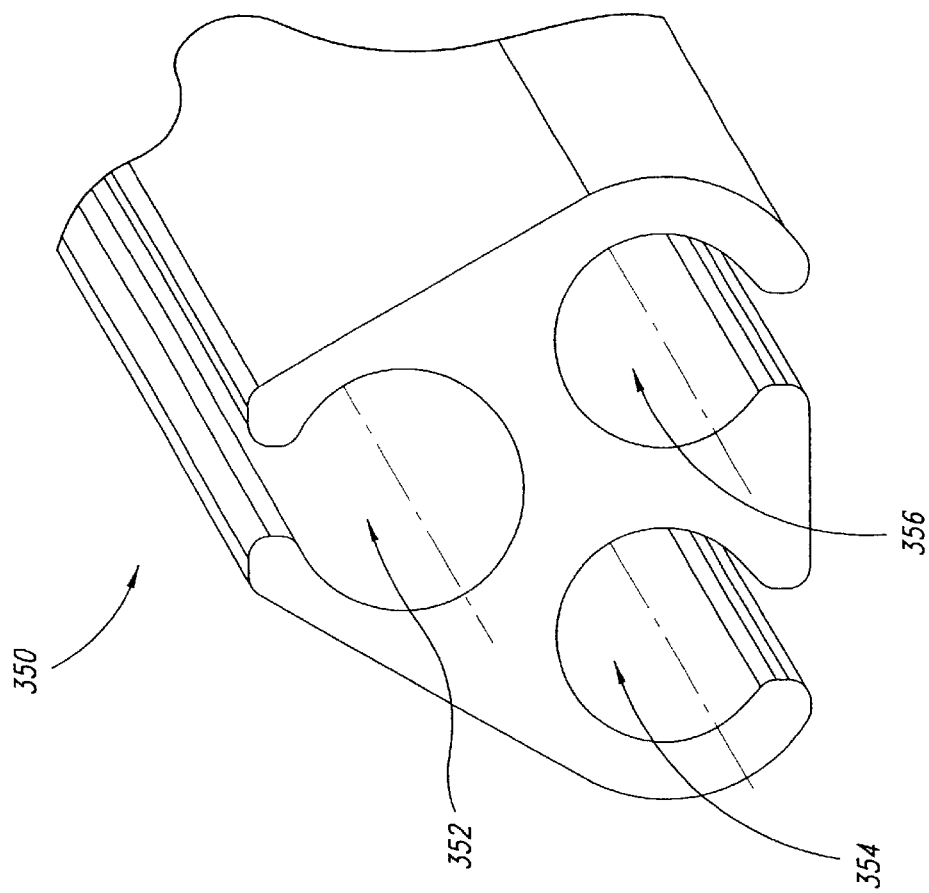
FIG. 3B is a partial top isometric view of a representative slide track in accordance with an embodiment of the present invention, wherein the slide track has three grooves in a triangular relationship with one another and which are all adapted to slidably engage a rod.
Figure 3A:
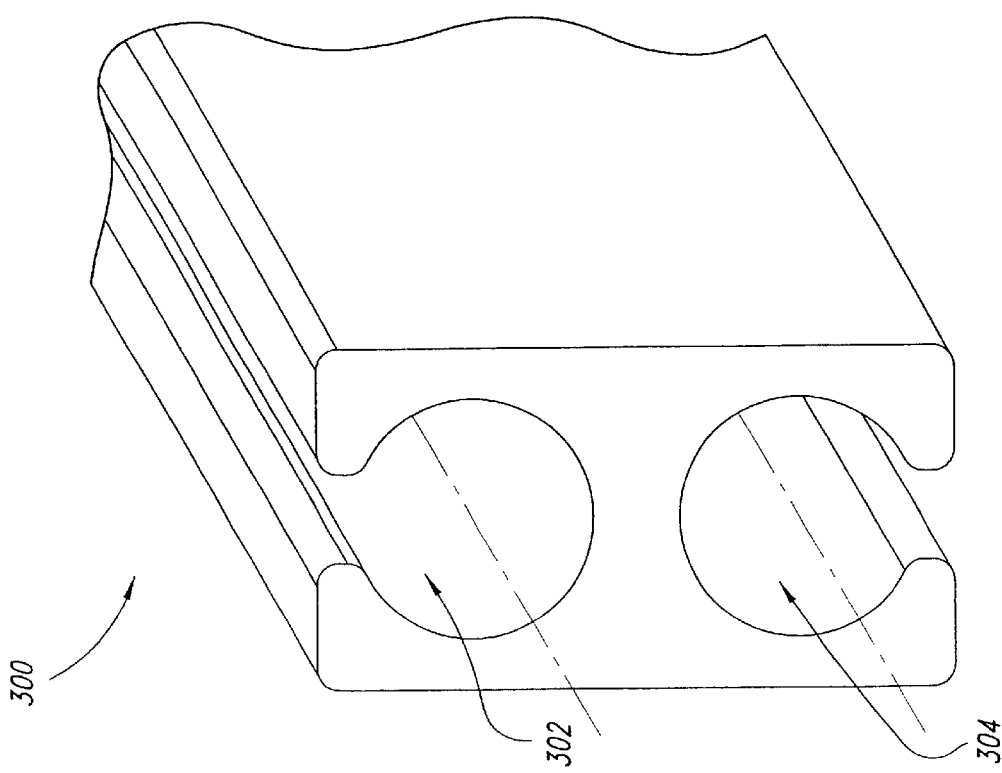
FIG. 3A is a partial top isometric view of a representative slide track in accordance with an embodiment of the present invention, wherein the slide track has two opposing grooves both of which are adapted to slidably engage a rod.

The collapsible protective enclosure of the present invention also includes one or more slide tracks having at least one groove, wherein each slide track is removably attachable to a cross-member associated with the protective enclosure. FIGS. 3A–B illustrates two exemplary slide tracks of the present invention.

More specifically, FIG. 3A illustrates a partial top isometric view of a representative slide track 300 in accordance with the present invention, wherein the slide track has two opposing grooves 302, 304, both of which are adapted to slidably engage a fabric encased rod (e.g., a welt) or an "awning cord." Similarly, FIG. 3B illustrates a partial top isometric view of a representative slide track 350 in accordance with the present invention, wherein the slide track has three grooves 352, 354, 356 in a triangular relationship with one another, and which are all adapted to slidably engage a fabric encased rod (e.g., a welt) or an "awning cord." Although FIGS. 3A–B depict grooves adapted to slidably engage a fabric encased "cylindrical" rod or awning cord (e.g., each groove runs along entire length of slide track), the present invention is not so limited. In particular, the grooves of the slide tracks may be adapted to slidably engage rods having a different geometry such as, for example, rods having oval-, triangular-, square-, rectangular-, pentagon- (et cetera) shaped cross-sections. Because the rods and/or awning cords are generally encased by fabric so as to define a welt, the slide tracks of the present invention are suitable for slidably hanging the foldable doors and/or sidewalls (which have welts along at least one edge as described in more detail below) associated with the collapsible protective enclosures of the present invention.

Furthermore, the slide tracks of the present invention may be of any length; however, each slide track is preferably about the length of its corresponding cross-member (associated with the frame structure of the collapsible protective enclosure) to which it is removably attached to. In addition, the at least one groove associated with the slide track generally runs along the slide track's entire length. Furthermore, the slide tracks of the present invention may be made from any number of solid materials such as, for example, plastic, metal, or even wood.

In one embodiment, the slide track is made from a plastic material such as, for example, a high or low density polyethylene (i.e., HDPE and LDPE), wherein the plastic material is appropriately shaped by employing a conventional extrusion technique. In one such extrusion process, a viscous melt of a thermoplastic material is forced under pressure through a shaping die in a continuous stream, wherein the die has a shape nearly identical to that of the cross-section (e.g., front face of exemplary slide tracks depicted in FIGS. 3A–B) of the slide track. The manufacturing of suitable slide tracks in accordance with the present invention is well within the skill of one having ordinary skill in the art; suitable slide tracks are also readily available from specialty architectural product suppliers (e.g., John Boyle and Company, Inc., Statesville, N.C. and Taco West, Inc., Kent, Wash.).

As noted above, the slide tracks are suitable for slidably hanging the foldable doors and/or sidewalls of the present invention. This feature exists because the foldable doors and sidewalls of the present invention have at least two edges; namely, a first edge that has at least one magnetic strip integrally associated therewith; and, a second edge that is adapted for slidable engagement with a slide track. As such, the collapsible protective enclosures of the present invention include, in addition to its underlying frame structure and protective covering, (1) a slide track having at least one groove (wherein the slide track is detachably attached to a cross-member associated with the frame structure), and (2) a door or sidewall that has a magnet associated with one edge and a welt associated with another edge. The novel structural features associated with the foldable door and sidewall, including the features that allow them to slidably hang from a cross-member of the collapsible protective enclosure, are more fully described below.

More specifically, and in another embodiment, the present invention is also directed to a foldable door or sidewall which is adapted for detachable attachment with a protective enclosure. In its simplest form, the foldable door or sidewall comprises a flexible sheet that has a continuous perimeter, wherein the continuous perimeter defines at least two edges. A first edge of the at least two edges has at least one magnetic strip integrally associated therewith (suitable magnetic strips are available from a number of suppliers such as Tricomp, Inc., Pompton Plains, N.J.), while another second edge of the at least two edges has structural features (e.g., fabric encased rod or awning cord) that allows it to slidably engage a slide track. For example, the flexible sheet may be in the form of a rectangular sheet of fabric in which a flat magnetic strip has been attached along one of the edges (e.g. sewn onto), and a rod has been attached along one of the other adjacent edges (e.g., integrally sewn and encased into). In this manner, the edge having the attached rod is adapted to slidably engage a slide track; and, when the slide track is attached to an elevated cross-member, the foldable door or sidewall may slidably hang from such slide track.

Figure 4:
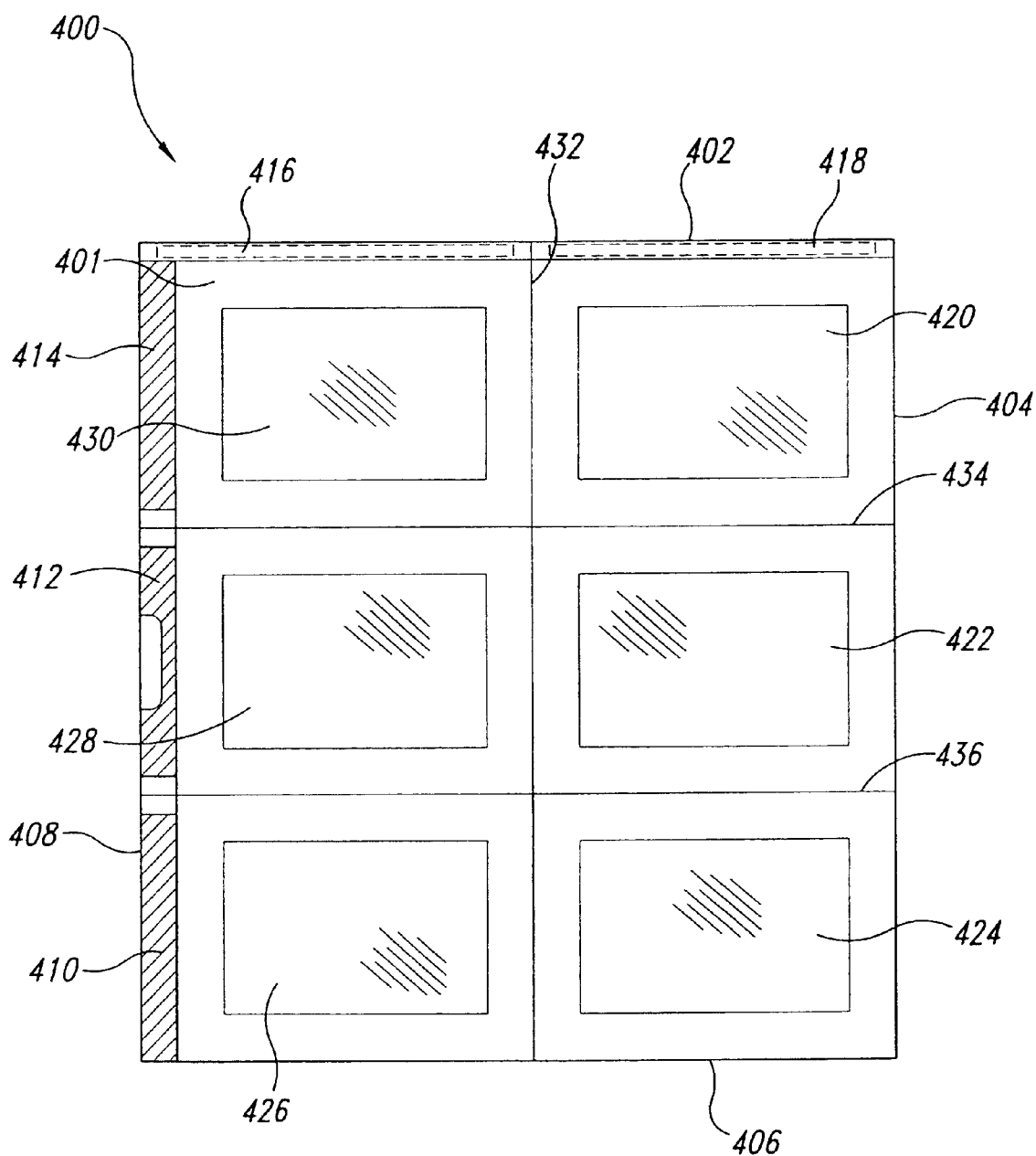
FIG. 4 is a side elevational view of a foldable door in accordance with an embodiment of the present invention.

More specifically, and as shown in FIG. 4, an exemplary foldable door 400 of the present invention includes a flexible sheet 401 having a continuous perimeter that defines four door edges 402, 404, 406, 408. The flexible sheet 401 may be made from a fibrous material such as, for example, a canvas made with naturally occurring fibers like cotton, linen, hemp, jute, and ramie. Alternatively, the flexible sheet 401 may be made from a synthetic material such as, for example, a vinyl (e.g., DURA-PRO available from Duracote Corporation, Ravenna, Ohio) or other suitable plastic. As shown, the flexible sheet 401 in this embodiment has three magnetic strips 410, 412, 414 sewn directly along a sidewall edge 408. The magnetic strips 410, 412, 414 are adapted to magnetically couple to corresponding magnets associated with a second foldable door (not shown). In addition, the flexible sheet 401 has two cylindrical rods 416, 418 (shown in hidden lines) sewn directly along the adjacent edge 402. In particular, the two rods 416, 418 are encased by the flexible sheet 401. Moreover, because the two rods 416, 418 have a gap therebetween, and because the foldable door 400 has a bisecting first crease 432 and two perpendicular trisecting creases 434, 436, the foldable door 400 may be readily folded into a smaller rectangular shape for purposes of storage and transportation.

In addition, the exemplary foldable door 400 further includes six semi-rigid thermoplastic resinous sheets 420, 422, 424, 426, 428, 430 that are in an integral and coplanar relationship with the flexible sheet 401 so as to define six windows. Exemplary methods for adhering such semi-rigid thermoplastic resinous sheets to a flexible sheet are disclosed in U.S. Pat. Nos. 5,472,771, 5,660,916 and 5,851, 637, which are all to Sofie et al., and are all incorporated herein by reference in their entirety. In short, these patents disclose methods for adhering a flexible fibrous sheet to a semi-rigid thermoplastic resinous sheet by (1) contacting an edge surface of the flexible fibrous sheet with a thermosetting resin, (2) allowing the resin to cure to yield a unified surface, (3) applying an adhesive along an edge surface of the semi-rigid sheet to yield an adhesive surface, and (4) contacting the unified surface of the flexible fibrous sheet with the adhesive surface of the semi-rigid sheet so that they adhere together.

The semi-rigid thermoplastic resinous sheet associated with this embodiment of the present invention may be made from a thermoplastic resin such as, for example, acrylonitrile-butadiene-styrene, acrylic, nylon, polycarbonate, polyethylene, polypropylene, polystyrene, or vinyl resin. All of these thermoplastics are available in sheet form from a number of different suppliers (e.g., Sheffield Plastics, Reading, Pa.). In addition, the semi-rigid thermoplastic resinous sheet may be transparent or it may be opaque. In alternative embodiments, the semi-rigid thermoplastic resinous sheet is mirrored or is adapted to change its opacity with changes in surrounding light intensity (i.e., the sheet may darken in sunlight). Furthermore, the semi-rigid thermoplastic resinous sheet may include one or more decorative strips or decals. For example, the thermoplastic sheet may include on its surface a decorative strip that alters the its transparency. Thus, in a further embodiment, the semi-rigid thermoplastic resinous sheet includes a strip of beveled tape that has the appearance of beveled glass (e.g., ACCENTRIM tape made by 3M Industrial Tape and Specialties Division, St. Paul, Minn.), which strip causes the window to have the appearance of beveled glass.

Figure 5:
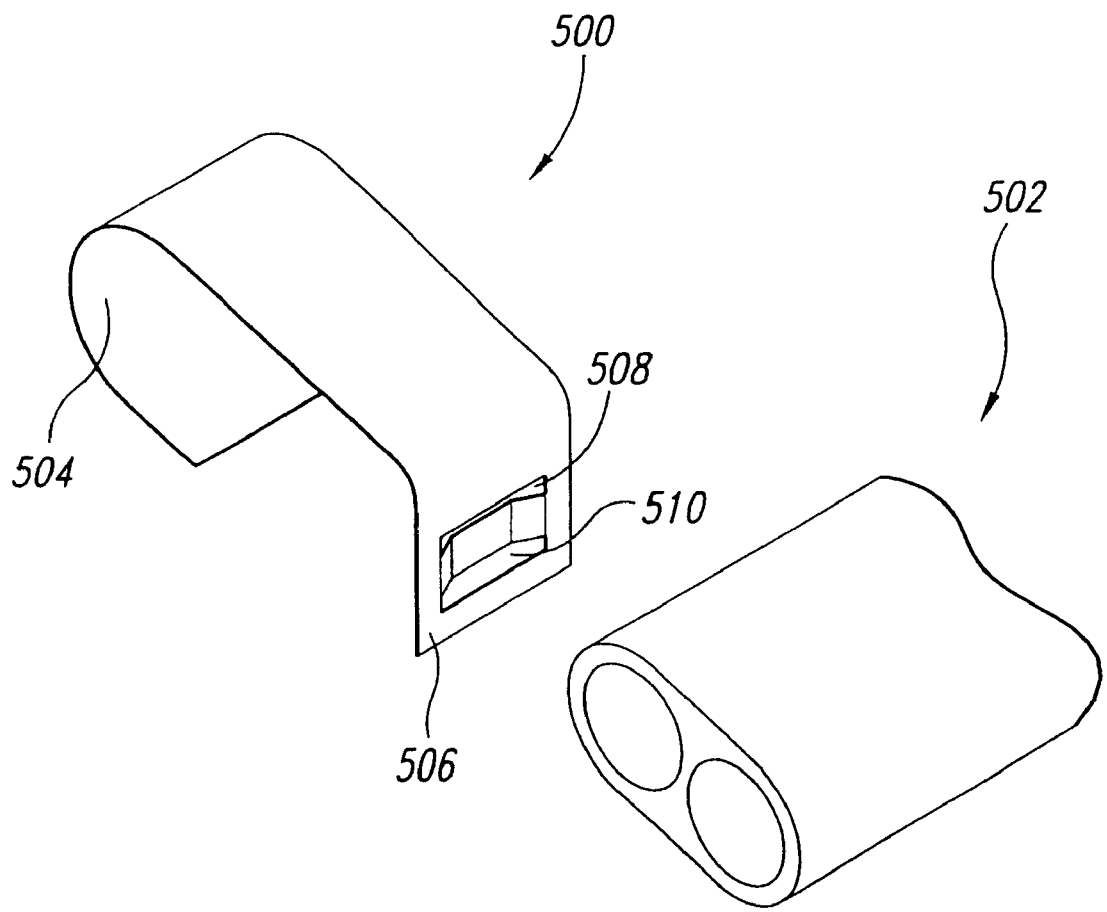
FIG. 5 is a perspective view of a slide track supporting device and a perspective partial view of a wrapped two-tube cross-member of a span tent in accordance with an embodiment of the present invention.

As noted above, the foldable door or sidewall of the present invention is adapted for detachable engagement with a protective enclosure. In general, this may be accomplished by attaching one or more slide track supporting devices to a cross-member associated with a protective enclosure. For example, and as shown in FIG. 5, a metal or plastic hook 500 may be attached (shown in detached position) to cross-member 502 associated with a protective enclosure (not shown). As shown, the hook 500 is made from a flat strip that has rounded hooking portion 504 at a first end and a flat portion 506 having two parallel slits 508, 510 adapted to engage a fastening strap (not shown) at a second end. The rounded hooking portion 504 is adapted to engage cross-member 502, wherein the cross-member 502 is a wrapped two-tube structure common to the underlying frame structure of many span tents.

Figure 6:
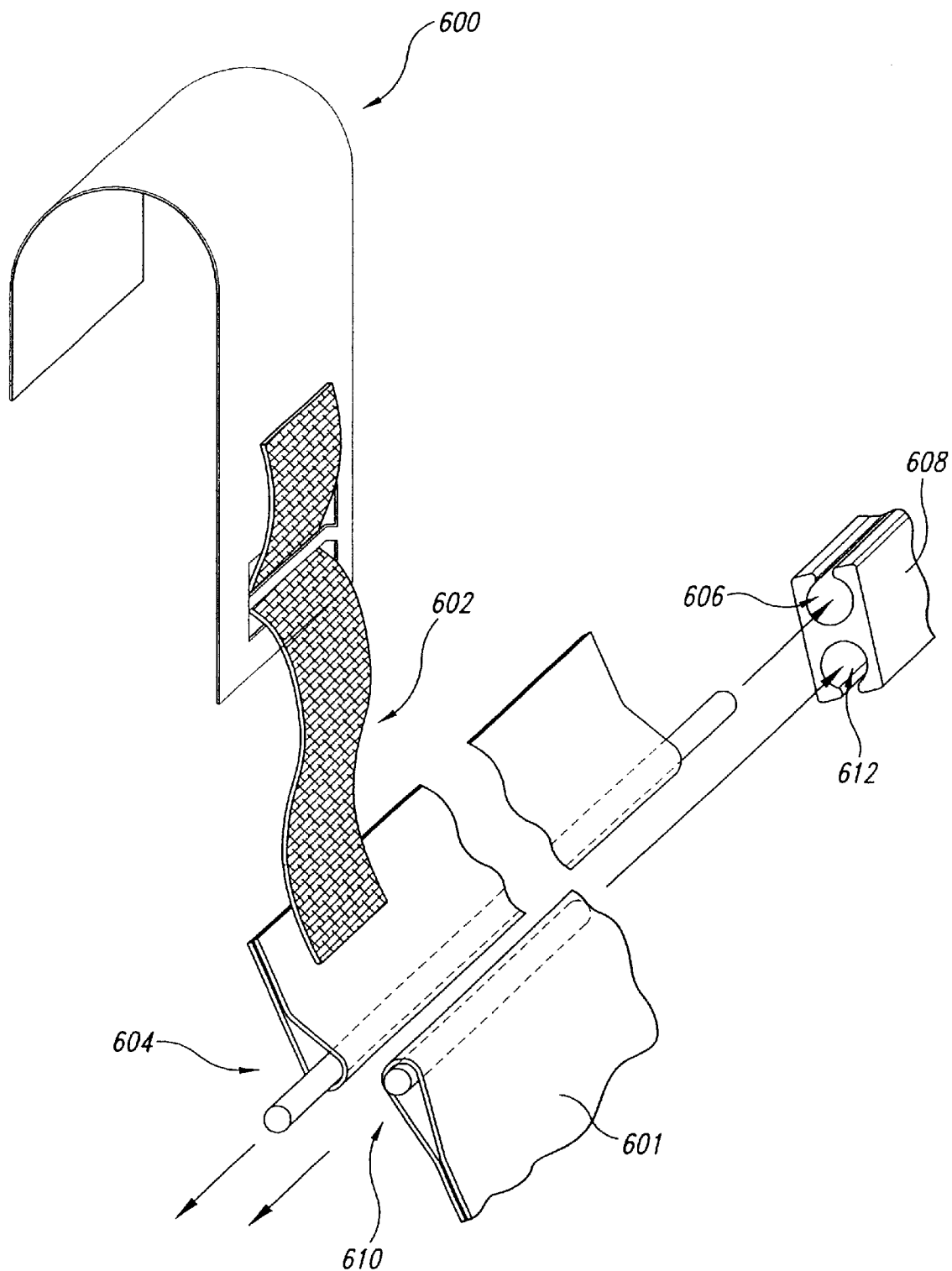
FIG. 6 is an exploded partial perspective view of a slide track supporting device, a slide track, and a door or sidewall in accordance with an embodiment of the present invention.

As shown in FIG. 6, the foldable door or sidewall 601 of the present invention is adapted for detachable engagement with a protective enclosure (not shown) in that a slide track supporting device in the form of a hook 600 is adjustably connected to an adjusting strap 602 which, in turn, is connected to a fabric encased rod 604 (shown in hidden lines and which defines a welt). The adjusting strap 602 allows for uniform adjustment and positioning of the foldable door or sidewall 601 in relation to the cross-member (not shown) from which it hangs. The fabric encased rod 604 or welt may then engage a first groove 606 of a slide track 608 (shown in part) such that the slide track 608 hangs from the cross-member of the protective enclosure (not shown). In like fashion, a foldable door or sidewall 601 (shown in part) having a second fabric encased rod 610 (shown in hidden lines and which defines a welt) may then engage a second groove 612 of the slide track 608 such that the foldable door or sidewall 601 hangs from the slide track 608. Moreover, the foldable door or sidewall 601, when engaged the second groove 612, is slidable in that the foldable door or sidewall may be moved along the slide track 608 in any number of positions.

Figure 7:
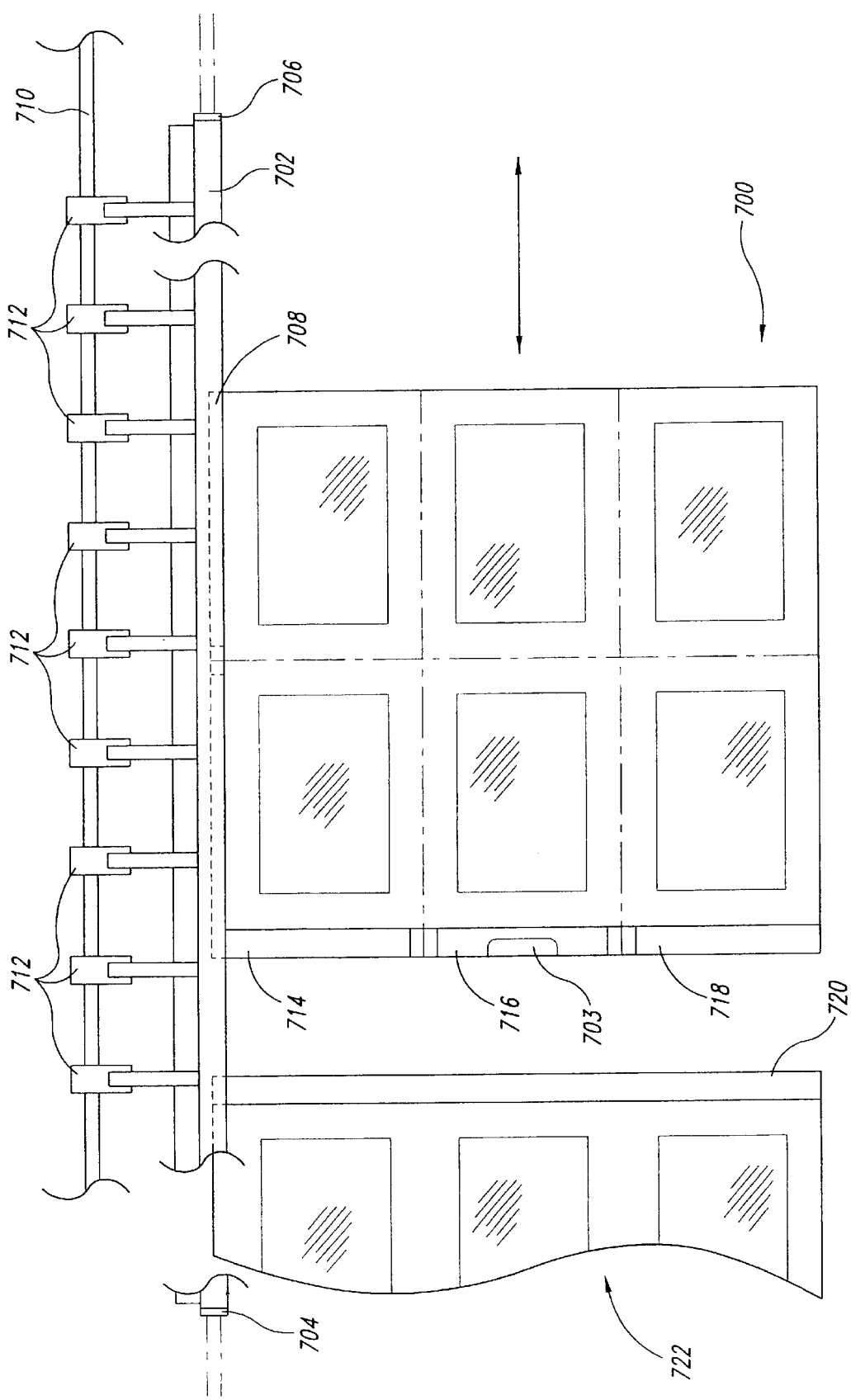
FIG. 7 is a side elevational view of a foldable door that is hanging (from a cross-member associated with a protective enclosure) via a plurality of slide track supporting devices, wherein the foldable door is in slidable engagement with the slide track in accordance with an embodiment of the present invention.

More specifically, and as shown in FIG. 7, a foldable door 700 of the present invention may be moved along a slide track 702 (by means of its door handle 703) in either one of two directions as indicated. To prevent disengagement, the slide track may have two end caps 704, 706 attached at both of its ends. The foldable door 700 is shown in this embodiment has hanging from a welt 708 (shown in hidden lines as two distinct rods which are encased by fabric) associated with a top edge, wherein the welt 708 is slidably engaged to the slide track 702. The slide track 702, in turn, is shown as adjustably hanging from a cross-member 710 (associated with a frame structure of a protective enclosure which is not shown) via a plurality slide track supporting devices 712. In addition, the foldable door 700 has three magnetic strips 714, 716, 718 attached to an adjacent side edge, wherein such strips are adapted to magnetically couple to one or more magnetic strips 720 associated with a second door or sidewall 722.

Figure 8:
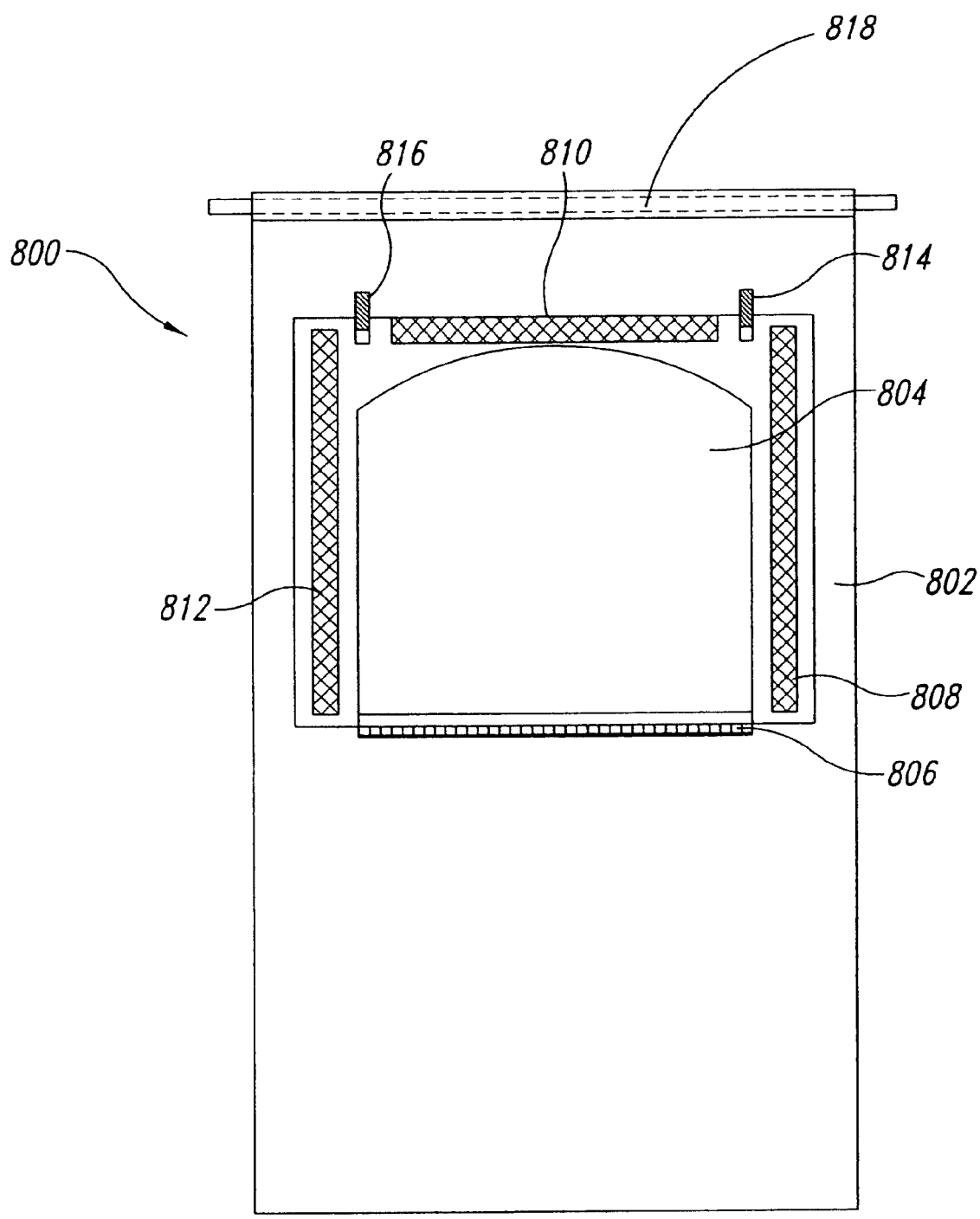
FIG. 8 is a side elevational view of an architectural window in accordance with an embodiment of the present invention.

In still another embodiment, the present invention is directed to an architectural window adapted for integral association with a foldable door or sidewall of a protective enclosure. In this embodiment, and as shown in FIG. 8, an architectural window 800 includes a flexible sheet 802 attached to a semi-rigid thermoplastic resinous 804 along a hinge 806. The flexible sheet 802 may be attached to the semi-rigid thermoplastic resinous sheet 804 in the same manner as discussed above in connection with the foldable door or sidewall of the present invention. In addition, the architectural window 800 of the present invention may be retained in a closed position (as shown) by one or more magnetic strips 808, 810, 812, and optionally in conjunction with two securing straps 814, 816. As also shown, the architectural window further includes a welt 818 (i.e., a fabric encased rod 820 shown in hidden lines) along its top edge, thereby enabling the architectural window 800 to be in slidable engagement with a slide track (not shown).

The present invention is also directed to a method for retrofitting a protective enclosure with a foldable door or sidewall in accordance with the present invention. More specifically, the method for retrofitting a protective enclosure with a foldable door or sidewall, comprises the steps of: providing a protective enclosure, wherein the protective enclosure includes a cross-member, and wherein the cross-member spans across a portion of the protective enclosure; attaching one or more slide track supporting devices to the cross-member; attaching a slide track to the one or more slide track supporting devices, wherein the slide track has at least one groove adapted to engage a welt associated with an edge of the foldable door or sidewall; and engaging the welt with the at least one groove of the slide track such that the foldable door or sidewall is in slidable engagement with the slide track. The cross-member may be a rope associated with a pole tent, or it may be a tube or a wrapped two-tube structure associated with a span tent.

The present invention is further directed to kit adapted to retrofit a protective enclosure with a foldable door or sidewall in accordance with the present invention. More specifically, the kit of the present invention includes a foldable door or sidewall, wherein the foldable door or sidewall comprises a flexible sheet, the flexible sheet having a continuous perimeter that defines a plurality of discrete door or sidewall edges, wherein at least one of the door or sidewall edges has a welt; a slide track having first and second grooves, wherein the first groove is adapted to slidably engage the welt of the foldable door or sidewall and the second groove is adapted to engage a rod; and one or more hooks having adjustable straps, wherein each of the one or more hooks has a hooked end adapted to detachably attach to a cross-member associated with the protective enclosure and a flat end having at least two slits adapted to adjustably engage a strap, and wherein each of the one or more straps is connected to the rod.

Figure 9:
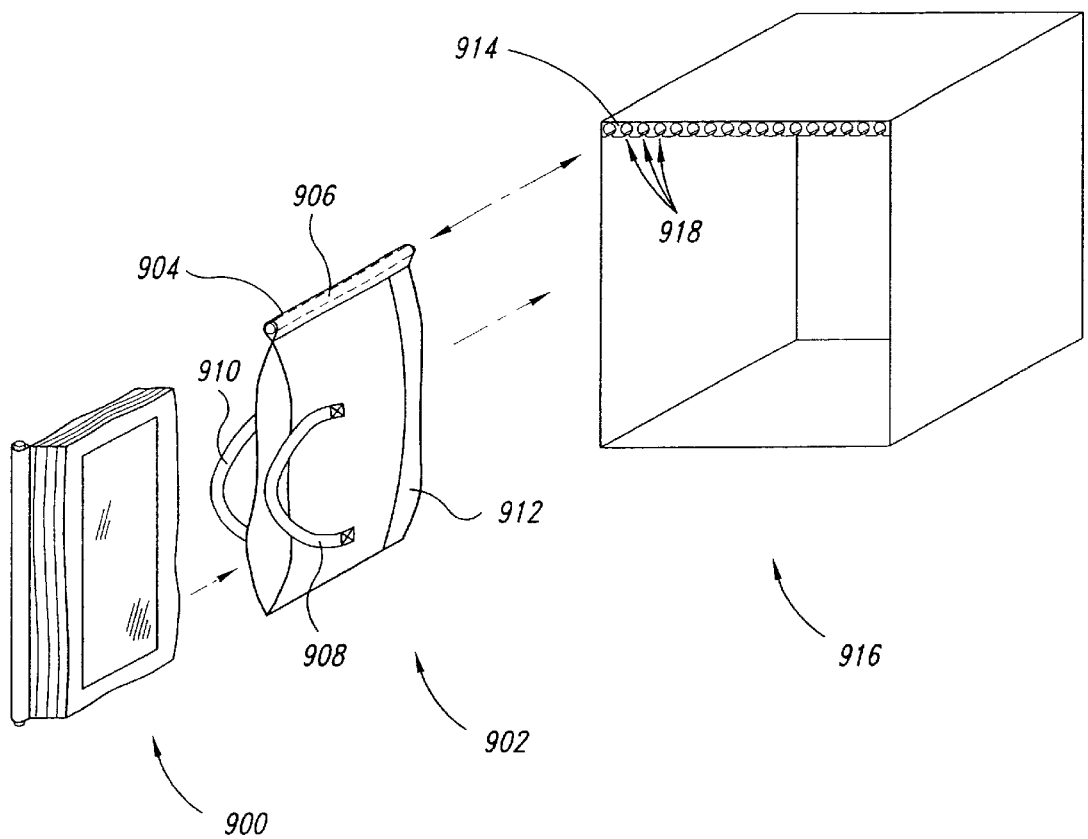
FIG. 9 is a perspective view of a folded door or sidewall, a corresponding bag, a storage container having a mounted slidetrack (having a plurality of grooves adapted to slidably engage a welt) in accordance with an embodiment of the present invention.

The present invention is still further directed to a system for conveniently storing and transporting foldable doors and sidewalls. In this embodiment, and as shown in FIG. 9, a foldable door or sidewall of the present invention may be folded along its respective crease lines into a smaller configuration. For example, a rectangular foldable door or sidewall may be folded into a smaller rectangle having a surface area roughly one sixth of that of the unfolded door or sidewall. In this configuration, the folded door or sidewall 900 may then be inserted into a corresponding storage bag 902, wherein the storage bag 902 has a welt 904 across an edge (i.e., a fabric encased rod 906 shown in hidden lines). The storage bag may have carrying straps 908, 910, and may have a fabric reinforced bottom portion 912 for added protection against dragging.

Because the storage bag 902 has a welt 904 across an edge, it is capable of slidable engagement with a mounted slide track 914. As shown, the slide track 914 is mounted onto the ceiling of a storage container 916, wherein the slide track 914 has a plurality of grooves 918 that are all adapted to slidably engage the welt 904 of the storage bag 902. The storage container 916 may be the back end of a truck, or it may be a crate. In either case, the storage container 916 is generally adapted to receive a plurality of storage bags, and it may even store unfolded doors and/or sidewalls which may be important when, for example, these components need drying.

Although not shown, the storage bags are generally color coded so as to facilitate tracking, set-up, and disassembly of the various components that comprise a protective enclosure. For example, a yellow color coded bag may be designated to store six paneled sidewalls (the six letters of "y-e-l-l-o-w" corresponds with six panels), a blue color coded bag may be designated to store four paneled sidewalls (the four letters of "b-l-u-e" corresponds with four panels), and a red color coded bag may be designated to three paneled doors (the three letters of "r-e-d" corresponds with three panels). In this fashion, the tracking, set-up, and disassembly of a protective enclosure may be greatly facilitated, especially in the context of large party/exhibition tents that have multiple sidewalls and doors of varying size.

While the products and methods of the present invention have been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A kit adapted to retrofit a protective enclosure with a flexible door or sidewall comprising:

a flexible door or sidewall, wherein the flexible door or sidewall comprises a flexible sheet, the flexible sheet having a continuous perimeter that defines a plurality of discrete door or sidewall edges, wherein at least one of the door or sidewall edges has a welt;

a slide track having at least first and second grooves, wherein the first groove is adapted to slidably engage the welt of the flexible door or sidewall and the second groove is adapted to engage a rod; and one or more hooks having adjustable straps, wherein each of the one or more hooks has a hooked end adapted to detachably attach to a cross-member associated with the protective enclosure and a flat end having at least two slits adapted to adjustably engage a strap, and wherein each of the one or more straps is connected to a rod.

2. The kit of claim 1 wherein the flexible sheet is a fibrous material.

3. The kit of claim 2 wherein the fibrous material is non-synthetic.

4. The kit of claim 3 wherein the non-synthetic fibrous material is a canvas.

5. The kit of claim 1 wherein the flexible sheet is a synthetic material.

6. The kit of claim 5 wherein the synthetic material is vinyl.

7. The kit of claim 1 wherein the flexible door or sidewall further comprises a semi-rigid thermoplastic resinous sheet in an integral and coplanar relationship with the flexible sheet, wherein the semi-rigid thermoplastic resinous sheet defines a window.

8. The kit of claim 7 wherein the semi-rigid thermoplastic resinous sheet is transparent.

9. The kit of claim 8 wherein the semi-rigid thermoplastic resinous sheet further comprises a strip affixed to a planar surface of the semi-rigid thermoplastic resinous sheet, wherein the strip alters the transparency of the otherwise transparent thermoplastic resinous sheet.

10. The kit of claim 7 wherein the semi-rigid thermoplastic resinous sheet is derived from an acrylonitrile-butadiene-styrene, acrylic, nylon polycarbonate, polyethylene, polypropylene, polystyrene, or a vinyl resin.

11. The kit of claim 7 wherein the semi-rigid thermoplastic resinous sheet is mirrored.

12. The kit of claim 1 wherein the flexible door or sidewall further comprises at least one magnet integrally associated with another of the plurality of discreet door or sidewall edges.

13. A collapsible protective enclosure for protecting an interior space from one or more natural elements, wherein the collapsible protective enclosure includes a frame structure that defines the interior space, wherein the interior space further defines a floor, a plurality of walls, and a roof, wherein the roof and plurality of walls intersect at a plurality of edges, and wherein the frame structure includes a cross-member spanning across at least one of the walls and adjacent to at least one of the plurality of edges, comprising:
  a slide track;
  a flexible door or sidewall; and
  a plurality of hooks having adjustable straps,
    wherein each of the plurality of hooks has a hooked end adapted to detachably attach to the cross-member, and a flat end having at least two slits adapted to adjustably engage a strap, the strap being connected to a rod, and wherein the flexible door or sidewall comprises a flexible sheet having a continuous perimeter that defines a plurality of discrete door or sidewall edges, at least one of the edges having a welt, and wherein the slide track has at least first and second grooves, the first groove being adapted to slidably engage the welt and the second groove being adapted to engage the rod.

14. The collapsible protective enclosure of claim 13 wherein the protective enclosure is a span tent or a pole tent.

15. The collapsible protective enclosure of claim 13 wherein the flexible sheet is a fibrous material.

16. The collapsible protective enclosure of claim 15 wherein the fibrous material is non-synthetic.

17. The collapsible protective enclosure of claim 16 wherein the non-synthetic fibrous material is a canvas.

18. The collapsible protective enclosure of claim 13 wherein the flexible sheet is a synthetic material.

19. The collapsible protective enclosure of claim 18 wherein the synthetic material is vinyl.

20. The collapsible protective enclosure of claim 13 wherein the flexible door or sidewall further comprises a semi-rigid thermoplastic resinous sheet in an integral and coplanar relationship with the flexible sheet, wherein the semi-rigid thermoplastic resinous sheet defines a window.

21. The collapsible protective enclosure of claim 20 wherein the semi-rigid thermoplastic resinous sheet is transparent.

22. The collapsible protective enclosure of claim 21 wherein the semi-rigid thermoplastic resinous sheet further comprises a strip affixed to a planar surface of the semi-rigid thermoplastic resinous sheet, wherein the strip alters the transparency of the otherwise transparent thermoplastic resinous sheet.

23. The collapsible protective enclosure of claim 20 wherein the semi-rigid thermoplastic resinous sheet is derived from an acrylonitrile-butadiene-styrene, acrylic, nylon polycarbonate, polyethylene, polypropylene, polystyrene, or a vinyl resin.

24. The collapsible protective enclosure of claim 20 wherein the semi-rigid thermoplastic resinous sheet is mirrored.

25. The collapsible protective enclosure of claim 13 wherein the flexible door or sidewall further comprises at least one magnet integrally associated with another of the plurality of discrete door or sidewall edges.

* * * * *